United States Patent [19]

Johnson et al.

[11] Patent Number: 4,497,638
[45] Date of Patent: Feb. 5, 1985

[54] FUEL GAS GENERATION FOR SOLIDS HEATING

[75] Inventors: Axel R. Johnson, North Babylon, N.Y.; Herman N. Woebcke, Stamford, Conn.

[73] Assignee: Stone & Webster Engineering Corp., Boston, Mass.

[21] Appl. No.: 178,491

[22] Filed: Aug. 15, 1980

Related U.S. Application Data

[63] Continuation-in-part of Ser. No. 82,048, Oct. 5, 1979, abandoned.

[51] Int. Cl.³ .............................................. C10J 3/46
[52] U.S. Cl. .................................. 48/197 R; 208/113; 208/127; 502/55
[58] Field of Search ............. 208/113, 127; 48/197 R, 48/202, 203, 206, 213, 215; 434/20, 25.1; 201/38; 252/417; 502/55

[56] References Cited

U.S. PATENT DOCUMENTS

| | | | |
|---|---|---|---|
| 2,325,516 | 7/1943 | Holt et al. | 252/417 |
| 2,464,532 | 3/1949 | Sellers | 252/417 |
| 2,736,687 | 2/1956 | Burnside et al. | 208/127 |
| 3,998,609 | 12/1976 | Crouch et al. | 48/206 |
| 4,061,562 | 12/1977 | McKinney et al. | 208/127 |

Primary Examiner—Peter Kratz
Attorney, Agent, or Firm—Hedman, Gibson, Costigan & Hoare

[57] ABSTRACT

An improved process and apparatus for generating fuel gas and decoking particulate solids used as the source of heat to effect chemical reactions in a TRC system.

2 Claims, 3 Drawing Figures

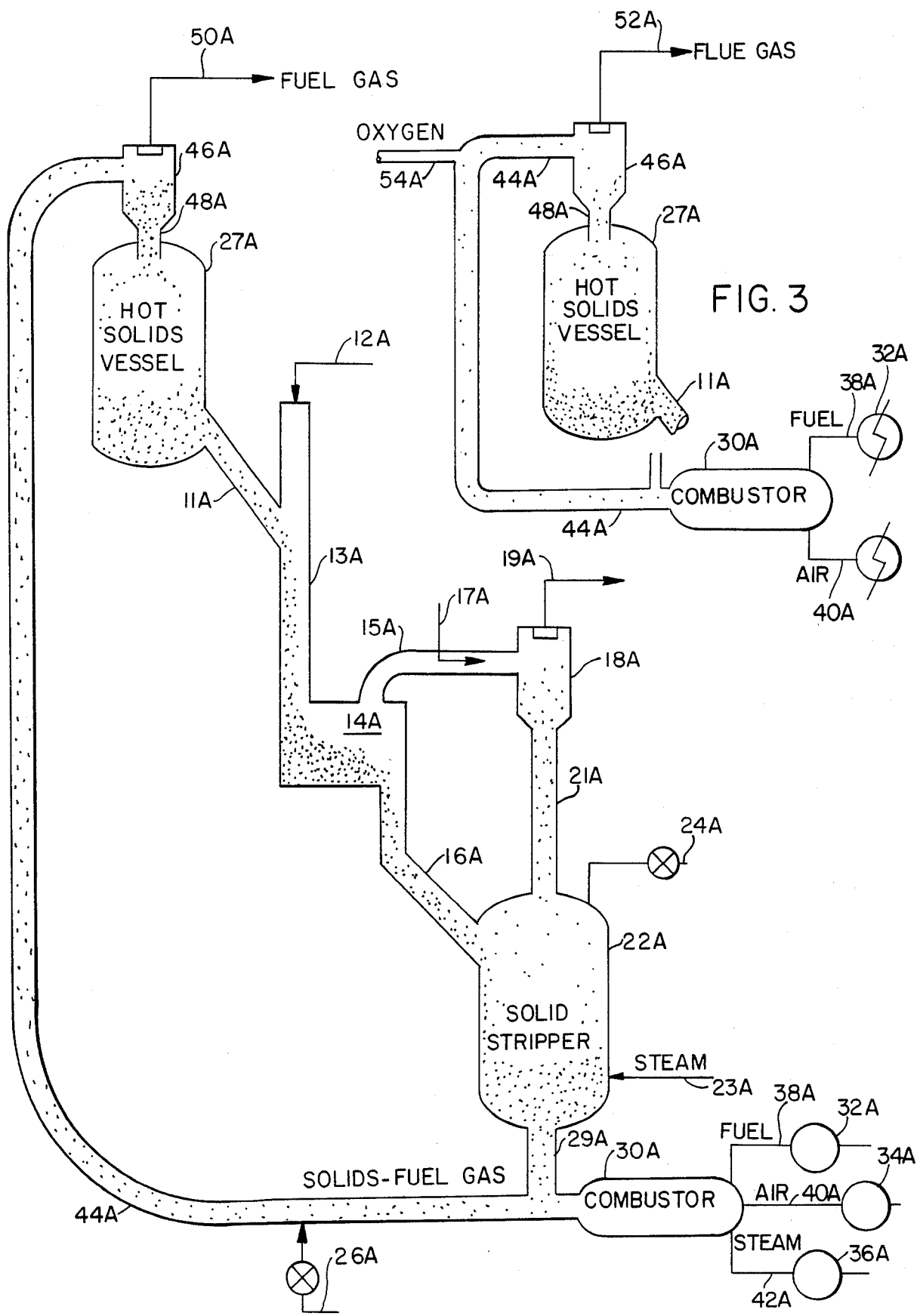

FUEL GAS GENERATION FOR SOLIDS HEATING

CROSS REFERENCE TO RELATED APPLICATION

This is a continuation-in-part of application Ser. No. 082,048, filed Oct. 5, 1979 now abandoned.

BACKGROUND OF THE INVENTION

1. Field of the Invention

This invention relates generally to processes and apparatus employing solids to provide the source of heat for chemical reaction. More specifically, the invention relates to the treatment of particulate solids used as the heat source to thermally crack hydrocarbons into olefins and to generate fuel gas coincident with the treatment of the particulate solids. The invention is particularly well adapted for use in an apparatus and process for use in the Thermal Regenerative Cracking (TRC) process, as described in U.S. Pat. No. 4,061,562 to McKinney et al and U.S. Pat. No. 4,097,363 to McKinney et al.

2. Description of the Prior Art

The use of solids in contact with gaseous or vaporized streams to effect a chemical reaction has long been in practice. The existing systems use both solids which participate in the reaction as catalyst or inert solids which provide the heat required for an endothermic reaction. Inert solids are used in fluidized bed reactors and in tubular reactors wherein solid-gas contact occurs in pneumatic flow.

In the prior art systems in which particulate solids are used to provide the heat required for reaction, coke is deposited on the particulate solids during the reaction. The coke is removed from the particulate solids during the combustion of fuel to provide the heat necessary for the reaction. The fuel used in the combustion step to heat the particulate solids is burned to a flue gas. Typically the fuel is burned with a high ratio of $CO_2$ to $CO$ in the presence of excess oxygen and the coke deposited on the particulate solids is burned and discharged as flue gas.

The combustion step occurs in fluid beds with relatively low gas velocities such as 3 feet per second. As a result, large diameter vessels are required for the combustion step. Customarily, the vessels have inside diameters of up to forty feet. In addition, the conventional large combustion vessels must be supported well above grade; i.e. 100 to 200 feet above grade.

SUMMARY OF THE INVENTION

It is an object of the process of the invention to remove the net coke deposited on particulate solids during the thermal cracking of hydrocarbon to olefins in the presence of fuel gas with steam and to convert the coke to additional fuel gas, and is particularly adapted for use in a TRC process.

It is a further object of the process of the invention to produce fuel gas during the combustion required to heat the particulate solids for the thermal cracking of hydrocarbons.

It is another object to provide a process wherein the fuel gas generated as a result of the initial combustion of fuel is burned within the system to provide additional heat and burn the coke from the particulate solids.

It is another object of the process of the invention to convert the sulfur in the fuel to $H_2S$ and thereby facilitate the removal of sulfur from the resultant combustion fuel gas and to eliminate the production of $NO_x$ from the combustion gas.

It is also an object of the process of the invention to more uniformly heat the particulate solids by providing intimate mixing of the source of heat with the particulate solids during combustion.

Accordingly, a process is provided in which fuel, air and steam are mixed and combusted to a temperature of about 1300° F.–2500° F. under conditions which produce a fuel gas having a high ratio of $CO$ to $CO_2$ and at least an equivalent molal ratio of $H_2$ to $H_2O$, preferentially richer in steam.

The fuel gas is mixed in a vessel with particulate solids discharged from the hydrocarbon cracking reactor to reheat the solids and remove the coke deposited on the solids. The fuel gas and particulate solids rapidly reach an equilibrium temperature of about 1,780° F. and thereafter travel through the transfer line at about 100 feet per second while heat is given up to steam decoke the solids particles. The mixture of fuel gas and particulate solids thereby cool to about 1,750° F. Separation of the fuel gas and particulate solids occurs next and the fuel gas is recovered while the particulate solids are delivered to the reactor to provide the heat for cracking.

In the alternative embodiment fuel and air are preheated and combusted to about 2,300° F. to produce a fuel gas. The hot fuel gas and particulate solids are mixed to an equilibrium temperature of about 1,500° F. Thereafter air is introduced into the line and the fuel gas is burned in the presence of the particulate solids to elevate the solids-gas temperature to about 1,750° F. and to burn the coke from the solids particles.

DESCRIPTION OF THE DRAWINGS

FIG. 2 is a schematic diagram of the fuel gas generation system and process of the subject invention.

FIG. 3 is an alternative embodiment wherein the fuel gas is burned to flue gas to provide additional heat for the particulate solids.

DESCRIPTION OF THE PREFERRED EMBODIMENT

Figure 1:
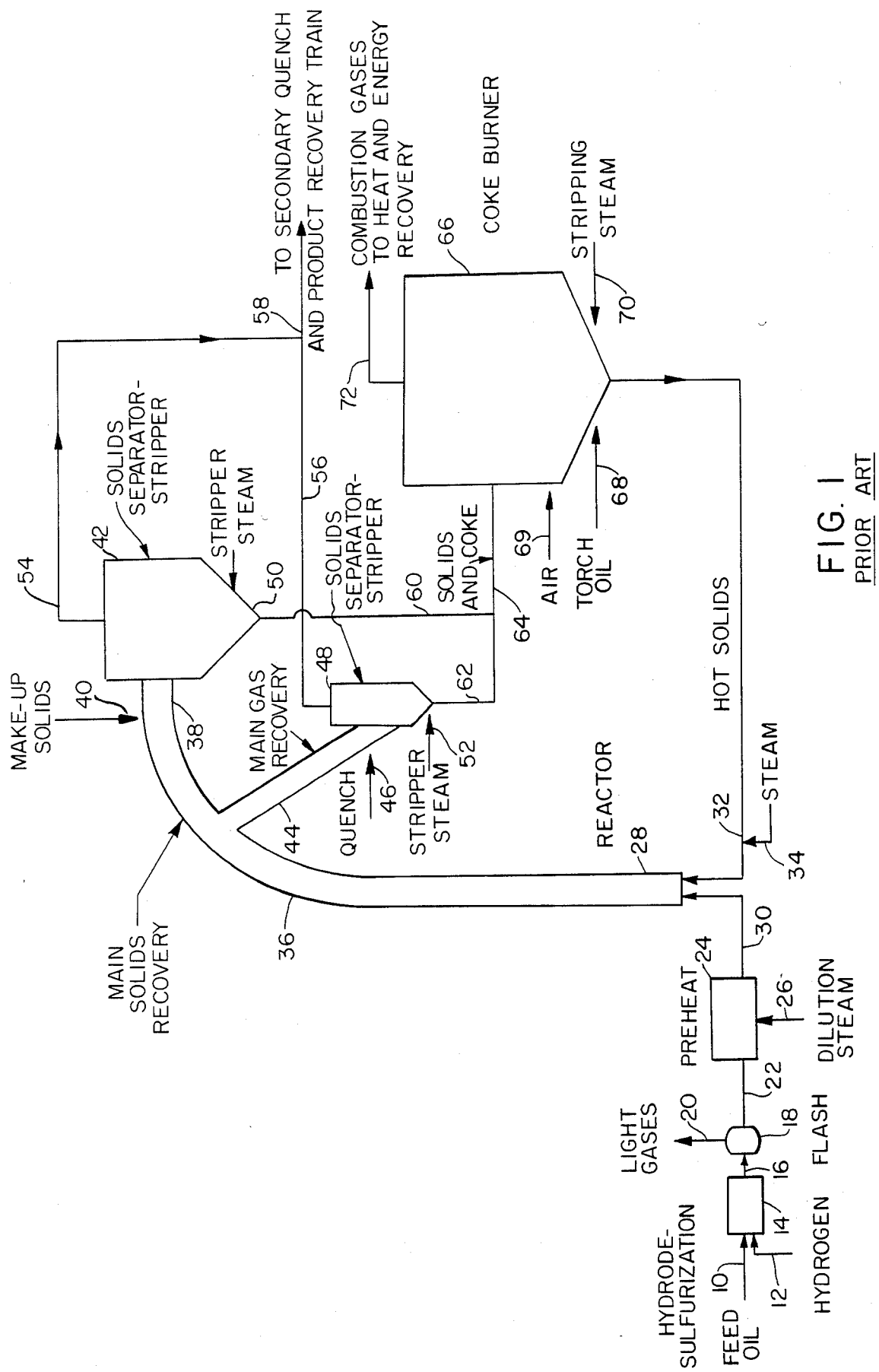
FIG. 1 is a schematic diagram of a TRC system and process according to the prior art.

Referring to FIG. 1, in the prior art TRC process and system, thermal cracker feed oil or residual oil, with or without blended distillate heavy gas, entering through line 10 and hydrogen entering through line 12 pass through hydrodesulfurization zone 14. Hydrosulfurization effluent passes through line 16 and enters flash chamber 18 from which hydrogen and contaminating gases including hydrogen sulfide and ammonia are removed overhead through line 20, while flash liquid is removed through line 22. The flash liquid passes through preheater 24, is admixed with dilution steam entering through line 26 and then flows to the bottom of thermal cracking reactor 28 through line 30.

A stream of hot regenerated solids is charged through line 32 and admixed with steam or other fluidizing gas entering through line 34 prior to entering the bottom of riser 28. The oil, steam and hot solids pass in entrained flow upwardly through riser 28 and are discharged through a curved segment 36 at the top of the riser to induce centrifugal separation of solids from the effluent stream. A stream containing most of the solids passes through riser discharge segment 38 and can be mixed, if desied, with make-up solids entering through line 40 before or after entering solids separator-stripper 42. Another stream containing most of the cracked product is discharged axially through conduit 44 and can be cooled by means of a quench stream entering through line 46 in advance of solids separator-stripper 48.

Stripper steam is charged to solids separators 42 and 48 through lines 50 and 52, respectively. Product streams are removed from solids separators 42 and 48 through lines 54 and 56, respectively, and then combined in line 58 for passage to a secondary quench and product recovery train, not shown. Cokeladen solids are removed from solids separators 42 and 48 through lines 60 and 62, respectively, and combined in line 64 for passage to coke burner 66. If required, torch oil can be added to burner 66 through line 68 while stripping stream may be added through line 70 to strip combustion gases from the heated solids. Air is charged to the burner through line 69. Combustion gases are removed from the burner through line 72 for passage to heat and energy recovery systems, not shown, while regenerated hot solids which are relatively free of coke are removed from the burner through line 32 for recycle to riser 28. In order to produce a cracked product containing ethylene and molecular hydrogen, petroleum residual oil is passed through the catalytic hydrodesulfurization zone in the presence of hydrogen at a temperature between 650° F. and 900° F., with the hydrogen being chemically combined with the oil during the hydrocycling step. The hydrosulfurization residual oil passes through the thermal cracking zone together with the entrained inert hot solids functioning as the heat source and a diluent gas at a temperature between about 1300° F. and 2500° F. for a residual time between about 0.05 to 2 seconds to produce the cracked product and ethylene and hydrogen. For the production of ethylene by thermally cracking a hydrogen feed at least 90 volume percent of which comprises light gas oil fraction of a crude oil boiling between 400° F. and 650° F., the hydrocarbon feed, along with diluent gas and entrained inert hot gases are passed through the cracking zone at a temperature between 1300° F. and 2500° F. for a residence time of 0.05 to 2 seconds. The weight ratio of oil gas to fuel oil is at least 0.3, while the cracking severity corresponds to a methane yield of at least 12 weight percent based on said feed oil. Quench cooling of the product immediately upon leaving the cracked zone to a temperature below 1300° F. ensures that the ethylene yield is greater than the methane yield on a weight basis.

FIG. 2 illustrates the improved process and system of the invention as may be embodied in a prior art TRC system, in lieu of the coke burner 66 (FIG. 1). Particulate solids and hydrocarbon feed gas enter a tubular reactor 13A through lines 11A and 12A respectively. The cracked effluent from the tubular reactor 13A is separated from the particulate solids in a separator 14A and quenched in line 15A by quench material injected from line 17A. The solids separated from the effluent are delivered through line 16A to a solids stripper 22A. The residual solids are removed from the quenched product gas in a secondary separator 18A and delivered to the solid stripper 22A through line 21A. The solids-free product gas is taken overhead from the secondary separator 18A through line 19A.

The particulate solids in the solid stripper 22A, having delivered heat during the thermal cracking in the tubular reactor 13A, must be reheated and returned to the tubular reactor 13A to continue the cracking process.

The particulate solids prior to being reheated, are stripped of gas in the solid stripper 22A by steam delivered to the solid stripper 22A through line 23A.

After the particulate solids have been stripped of gas impurities in the solid stripper 22A, the particulates solids are at a temperature of about 1,450° F.

The fuel gas generation apparatus of the invention consists of a combustion vessel 30A, and pre-heat equipment for fuel, air (or $O_2$) and steam which are delivered to the combustion vessel 30A. Pre-heaters 32A, 34A, and 36A are shown in fuel line 38A, air line 40A, and steam line 42A respectively.

The system also includes a transfer line 44A into which the combusted fuel gas from the combustion vessel 30A and the stripped particulate solids from the solid stripper 22A are mixed to heat and decoke the particulate solids. The transfer line 44A is sized to afford sufficient residence time for the steam emanating from the combustion vessel 30A to decompose by the reaction with carbon in the presence of hydrogen and to remove the net carbon from the solids-gas mixture. In the preferred embodiment the transfer line 44A will be about 100 feet long. A line 26A is provided for pneumatic transport gas if necessary.

A separator, such as a cyclone separator 46A is provided to separate the heated decoked particulate solids from the fuel gas. The particulate solids from the separator 46A are returned through line 48A to the hot solids hold vessel 27A and the fuel gas is taken overhead through line 50A.

In the process, fuel, air and steam are delivered through lines 38A, 40A and 42A respectively to the combustion vessel 30A and combusted therein to a temperature of about 2,300° F. to produce a fuel gas having a high ratio of CO to $CO_2$ and at least an equivalent molal ratio of $H_2O$ to $H_2$. The $H_2O$ to $H_2$ ratio of the fuel gas leaving the combustion vessel 30A is above the ratio required to decompose steam by reaction with carbon in the presence of hydrogen and to insure that the net carbon in the fuel gas-particulate solids mix will be removed before reaching the separator 46A.

The fuel gas from combustion vessel 30A at a temperature of about 2,300° F. is mixed in the tubular vessel 44A with stripped particulate solids having a temperature of about 1,450° F. The particulate solids and fuel gas rapidly reach an equilibrium temperature of 1,780° F. and continue to pass through the tubular vessel 44A. During the passage through the tubular vessel 44A the particulate solid-fuel gas mixture provide the heat necessary to react the net coke in the mixture with steam. As a result, the particulate solid-fuel gas mixture is cooled by about 30° F. i.e., from 1,780° F. to 1,750° F.

The particulate solid-fuel gas mixture is separated in the separator 46A and the fuel gas is taken at 1,750° F. through line 50A. The particulate solids are delivered to the hot solids hold vessel 27A at 1,750° F. and then to the tubular reactor 13A.

In the alternative embodiment of the invention illustrated in FIG. 3, only fuel and air are delivered to the combustor 30 and burned to a temperature of about 2,300° F. to provide a fuel gas. The fuel gas at 2,300° F. and particulate solids at about 1,450° F. are mixed in transfer line 44A to a temperature of about 1,486° F. Thereafter air (or oxygen) is delivered to the transfer line 44A through a line 54A. The fuel gas in the line 44A is burned to elevate the temperature of the particulate solids to about 1,750° F. The resultant flue gas is separated from the hot solids in the separator 46A and discharged through the line 52A. The hot particulate solids are returned to the system to provide reaction heat.

An example of the system and process of FIG. 3 follows: 7,000 pounds per hour of fuel pre-heated to 600° F. in the preheater 32A and 13 MM SCFD of air heated to 1,000° F. are burned in the combustor 30A to 2,300° F. to produce 15.6 MM SCFD of fuel gas.

The 15 MM SCFD of fuel gas at 2,300° F. is mixed in the transfer line 44A with 1 MM pounds per hour of stripped particulate solids from the solids stripper 22A. The particulate solids have 1,600 pounds per hour of carbon deposited thereon. The composite fuel gas-particulate solids gas mixture reaches an equilibrium temperature of 1,480° F. at 5 psig in about 5 milliseconds. Thereafter, 13 MM SCFD of air is delivered to the transfer line 44A and the 15.6 MM SCFD of fuel gas is burned with the air to elevate the solids temperature to 1,750° F. and burn the 1,600 pounds per hour of carbon from the particulate solids.

The combusted gas from the transfer line 44A is separated from the solids in the separator 46A and discharged as flue gas.

I claim:

1. In a TRC process wherein the temperature in the cracking zone is between 1300° and 2500° F. and wherein hydrocarbon feed or hydrodesulfurization residual oil along with entrained inert solids and a diluent gas are passed through the cracking zone for a residence time of 0.05 to 2 seconds, the improvement comprising the process for generating fuel gas and removing coke deposited on said solids comprising:
    (a) generating fuel gas having a high CO to $CO_2$ ratio and a high molal ratio of $H_2O$ to $H_2$ from fuel, air and steam;
    (b) delivering the fuel gas with steam to a tubular transfer line;
    (c) delivering particulate solids having coke deposits thereon to the tubular transfer line;
    (d) mixing the fuel gas containing the steam and the particulate solids to reach an equilibrium temperature; and
    (e) converting the coke deposits from the particulate solids to fuel gas with the heat and the steam in the tubular transfer line.

2. A process as in claim 1 wherein the particulate solids are decoked by the passage with the fuel gas containing steam by passage through the tubular transfer line at about 100 feet per second and the steam decoking reaction reduces the particulate solids-fuel gas temperature.

* * * * *